(12) United States Patent
Prebeck et al.

(10) Patent No.: US 8,065,062 B2
(45) Date of Patent: Nov. 22, 2011

(54) MOBILE AGRICULTURAL VEHICLE

(75) Inventors: Stefan Prebeck, Passau (DE); Kurt Schachner, St. Peter/Au (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 834 days.

(21) Appl. No.: 12/067,829

(22) PCT Filed: Oct. 6, 2006

(86) PCT No.: PCT/EP2006/009674
§ 371 (c)(1),
(2), (4) Date: Mar. 24, 2008

(87) PCT Pub. No.: WO2007/045362
PCT Pub. Date: Apr. 26, 2007

(65) Prior Publication Data
US 2008/0195272 A1      Aug. 14, 2008

(30) Foreign Application Priority Data
Oct. 21, 2005   (DE) .......................... 10 2005 050 544

(51) Int. Cl.
*G06F 19/00*   (2006.01)
(52) U.S. Cl. ......................................... 701/50; 701/53

(58) Field of Classification Search ................... 701/50, 701/51, 52, 53, 54, 29
See application file for complete search history.

(56) References Cited

U.S. PATENT DOCUMENTS

| 4,286,477 | A  | * | 9/1981 | Meyerle et al. ................ 475/82 |
| 4,866,622 | A  | * | 9/1989 | Dreher et al. ................ 701/102 |
| 5,924,371 | A  | * | 7/1999 | Flamme et al. ................ 111/177 |
| 6,766,231 | B2 | * | 7/2004 | Nakagawa et al. ............ 701/29 |
| 6,990,399 | B2 |   | 1/2006 | Hrazdera et al. |
| 2003/0161906 | A1 |   | 8/2003 | Braunhardt et al. |
| 2005/0131600 | A1 | * | 6/2005 | Quigley et al. ................ 701/33 |

FOREIGN PATENT DOCUMENTS

| DE | 195 05 845 A1 | 9/1995 |
| DE | 102 50 694 B3 | 2/2004 |
| DE | 102 49 757 A1 | 5/2004 |
| DE | 10 2005 015 162 B3 | 5/2006 |
| EP | 1 338 934 A1 | 8/2003 |

* cited by examiner

*Primary Examiner* — Darnell Jayne
*Assistant Examiner* — Stanton L Krycinski
(74) *Attorney, Agent, or Firm* — Davis & Bujold, P.L.L.C.

(57) ABSTRACT

To eliminate the need for additional operating elements for fine tuning the management of the engine and transmission of a mobile agricultural vehicle, the electronic transmission-control unit is connected via an ISO bus to the ISO bus terminal, such that current transmission data can be displayed in the cabin of the vehicle and adjustments can be made via the ISO bus terminal to modify this transmission data.

7 Claims, No Drawings

MOBILE AGRICULTURAL VEHICLE

This application is a national stage completion of PCT/EP2006/009674 filed Oct. 6, 2006, which claims priority from German Application Serial No. 10 2005 050 544.9 filed Oct. 21, 2005.

FIELD OF THE INVENTION

The invention concerns a mobile agricultural vehicle.

BACKGROUND OF THE INVENTION

DE 102 49 757 A1 discloses an agricultural commercial vehicle to which mounted implements can be attached. The vehicle comprising a CAN bus by way of which data and information exchange takes place within the vehicle and comprising an ISO bus such that data and information exchange takes place between the vehicle and the mounted implement. When using mounted implements, signals are passed on via the ISO bus without prior activation or bypassing of actuators. This makes it possible to operate the mounted implements also by way of an external key device arranged on the agricultural vehicle.

The purpose of the present invention is to provide a mobile agricultural vehicle in which the driver can control the vehicle and the mounted implements using a single display and control unit.

SUMMARY OF THE INVENTION

According to the invention, the mobile vehicle comprises a CAN bus via for exchanging data and information within the vehicle and an ISO bus via which a display unit can be brought into connection with an electronic control unit, such that transmission data stored in the electronic control unit can be displayed on the display unit. This data, stored in the electronic control unit of the transmission, is also known as the working set and can preferably consist of current data such as the speed of the transmission drive input, the speeds of the transmission drive outputs and, in the case of power-branched hydrostatic-mechanical transmissions, the speeds of the hydrostats. Furthermore, it is possible to display current gearbox transmission ratios as well as oil-change intervals and the residual life of components. Fault messages derived from the transmission control unit can also be shown on the display unit. The display unit is also known as an ISO bus terminal and comprises an input means in addition to the screen display. Input can take place directly via the screen by virtue of a touch-screen function, but the display unit preferably comprises additional push-buttons and induction regulators arranged near the screen.

In a further embodiment of the invention, the display unit comprises a serial interface such that new programs or upgrades of the transmission control system can be uploaded via the ISO bus to the electronic control unit of the transmission.

In a further embodiment of the invention, the connection between the display unit and the electronic control unit of the transmission consists of the CAN bus connection of the vehicle and an electronic control unit, a so-termed bridge-ECU, whereby the display unit is also connected to the electronic control unit of the transmission. By way of the input means at the display unit, for example the push-buttons and induction regulators, it is possible to use an induction regulator as a compression potentiometer for the electronic control unit of the transmission, an induction regulator as a way to control the magnitude of the speed, for example a cruise control, a push-button for calibrating the system and via the touch-screen, for example to input codes for independently initiating special transmission functions.

By virtue of the connection of the electronic control unit of the transmission, via the ISO bus to the ISO bus terminal, additional operating elements are no longer needed for fine tuning the engine-transmission management in the cabin of the mobile agricultural vehicle and there is no need for display units for which display transmission-specific information that does not have to be continually available to the driver.

The invention claimed is:

1. A mobile agricultural vehicle comprising:
a CAN bus facilitating an exchange of data and information within the vehicle;
an ISO bus;
a single display unit connected to the ISO bus;
a transmission electronic control unit being connected to the single display unit, via the ISO bus, so that transmission data stored in the transmission electronic control unit can be displayed on the single display unit;
the transmission data consisting of a current speed of a transmission drive input, current speeds of transmission drive outputs and current speeds of hydrostats;
the single display unit displaying current gearbox transmission ratios, oil-change intervals, residual life of components, and fault messages derived from the transmission control unit;
the single display unit functioning as an ISO bus terminal and including direct input means, via a touch-screen function, and at least one push-button and at least one induction regulator both being arranged adjacent the touch-screen;
the single display unit including a serial interface for uploading both new programs and upgrades of the transmission control system, via the ISO bus, to the transmission electronic control unit of the transmission;
at least one induction regulator functioning as a compression potentiometer for the transmission electronic control unit;
at least one induction regulator for controlling a magnitude of the speed;
at least one push-button for calibrating the control system; and
the touch-screen facilitating inputting codes for independently initiating special transmission functions;
the single display unit facilitating control of both the vehicle and the at least one mounted implement, by a mobile agricultural vehicle driver, by using a single display and control unit.

2. The mobile agricultural vehicle according to claim 1, wherein an intended speed is inputted by the input means to the single display unit.

3. The mobile agricultural vehicle according to claim 2, wherein a combustion engine pressure setting is inputted by the input means to the single display unit.

4. The mobile agricultural vehicle according to claim 3, wherein a combustion engine calibration is inputted by the input means to the single display unit.

5. The mobile agricultural vehicle according to claim 4, wherein the transmission is a power-branched hydrostatic-mechanical transmission.

6. The mobile agricultural vehicle according to claim 5, wherein the transmission electronic control unit is connected directly to the single display unit via the CAN bus and a bridge-ECU.

7. The mobile agricultural vehicle according to claim 6, wherein the single display unit includes a serial interface through which programs are transferred to the transmission electronic control unit.

* * * * *